H. H. SWAN.
TIRE.
APPLICATION FILED SEPT. 26, 1921.

1,428,817.

Patented Sept. 12, 1922.

Inventor:
Herbert H. Swan
by Cyrus W. Rice
his Attorney.

Patented Sept. 12, 1922.

1,428,817

UNITED STATES PATENT OFFICE.

HERBERT H. SWAN, OF GRAND RAPIDS, MICHIGAN, ASSIGNOR TO GRAND RAPIDS TIRE AND RUBBER CORPORATION, OF GRAND RAPIDS, MICHIGAN, A CORPORATION OF DELAWARE.

TIRE.

Application filed September 26, 1921. Serial No. 503,146.

*To all whom it may concern:*

Be it known that I, HERBERT H. SWAN, a citizen of the United States, residing at Grand Rapids, in the county of Kent and State of Michigan, have invented new and useful Improvements in Tires, of which the following is a specification.

The present invention relates to tires for vehicle wheels; and its object is to provide such a tire having an inner body portion of suitable material and an outer rubber portion united therewith and having outwardly extending concentric ribs so disposed as to enable the tire to climb out of ruts and depressions in the road, the material of said outer portion including its ribs being so formed as to economize to the best advantage the material from which it is made.

This object is attained by, and the invention finds preferable embodiment in, the structure hereinafter particularly described in the body of this specification and illustrated by the accompanying drawings, in which:—

Figure 1:
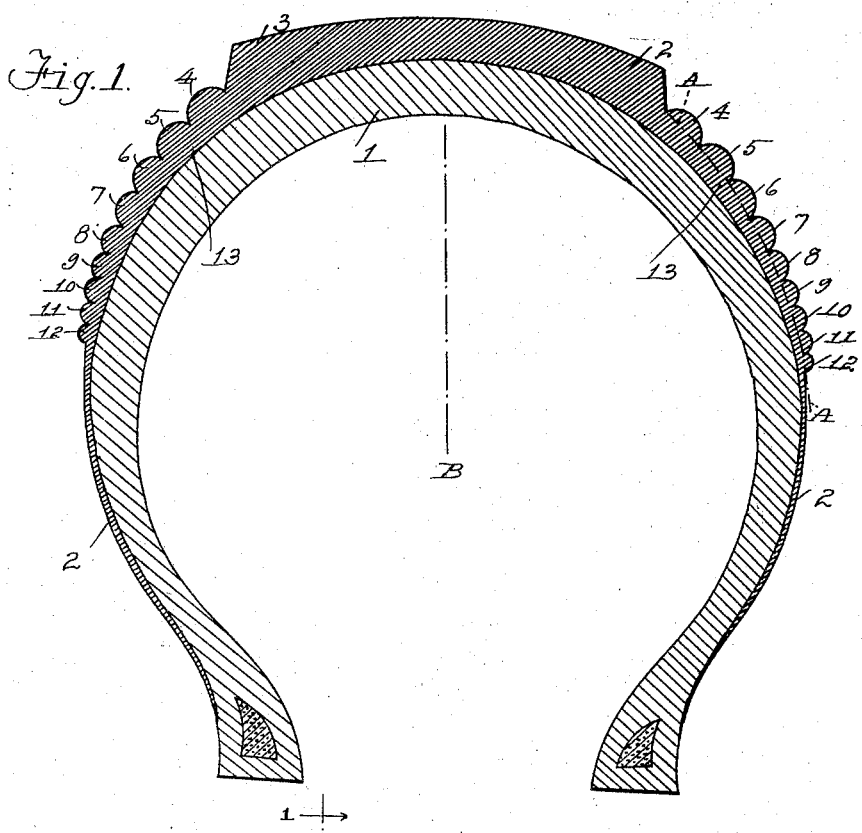
Figure 2:
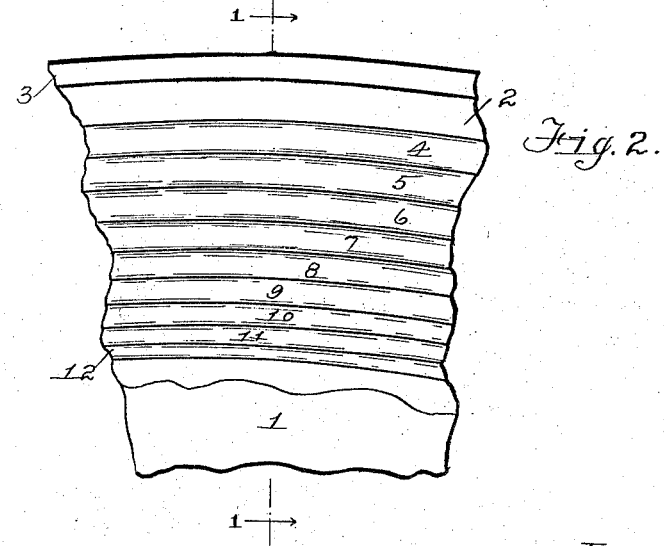

Figure 1 is a cross sectional view of a pneumatic tire taken on a radial plane, as that indicated by line 1—1 of Figure 2; and Figure 2 is a side view of a sufficient fragment of said tire to illustrate my invention.

In the embodiment of the invention chosen for illustration by the drawings and for detailed description in the body of this specification, a pneumatic tire for the wheels of vehicles such as automobiles, is shown. This tire comprises the inner body portion 1 of fabric or the like of any usual form and construction and the outer portion 2 of rubber united to the inner portion 1 in the usual manner. These two portions form the "casing" of the pneumatic tire which contains the air-holding "inner tube" of any ordinary construction (not shown). The outer rubber portion has the peripheral "tread" 3 and at the side thereof a plurality of concentric ribs 4, 5, 6, 7, 8, 9, 10, 11 and 12, numbering nine in the particular construction illustrated. Preferably these ribs, as in the construction shown, convex outwardly in cross-section. The outer rubber portion 2 has also the base 13 from which these ribs extend outwardly and integrally therewith, such base as distinguished from the ribs being defined relatively thereto by a dotted line A at the right hand side of Figure 1. The ribs which are further from the periphery 3 of the tire extend laterally further from the central plane (indicated by the dotted line B in Figure 1) of the tire which plane is perpendicular to the tire's rotative axis, than the ribs which are nearer said periphery, in order that the sides of a rut in which the wheel may be rolling may be engaged by the ribs which are further from the tire's periphery at points in the rut's sides higher than those engaged by the ribs which are nearer the wheel's periphery, thus to better effect the climbing of the wheel out of the rut.

The ribs which are nearer the tire's periphery are larger—i. e., of greater cross-sectional area—than the ribs further from said periphery, inasmuch as such nearer ribs must sustain greater weight and stress; and as they must thus sustain greater weight and stress the base 13 beneath such ribs is thicker than the base beneath smaller ribs further from the tire's periphery, the base 13 under the ribs thus diminishing in thickness toward the axis of the wheel, as clearly seen in Figure 1. The rubber forming the ribs and the base underlying the same is thus so disposed as to effect the greatest economy of material, the base being thicker where necessary and thinner where a thin base is sufficient.

The invention being intended to be pointed out in the claims, is not to be limited to or by details of construction of the particular embodiment thereof illustrated by the drawings and hereinbefore described.

I claim:

1. A tire having an inner body portion and an outer rubber portion united therewith, the outer portion having a peripheral tread and at the side thereof a plurality of concentric ribs extending longitudinally in the tire's circumferential direction, each rib extending laterally further from the central plane of the tire which is perpendicular to its rotative axis than, and being of less cross-sectional area than, the rib nearer the tire's periphery, the outer portion having also a base from which the ribs extend integrally therewith, said base beneath the ribs diminishing in thickness from the tread toward the rotative axis of the tire.

2. A tire having an inner body portion and an outer rubber portion united therewith, the outer portion having a peripheral tread and at the side thereof a plurality of concentric ribs cross-sectionally convexing outward and extending longitudinally in the tire's circumferential direction, each rib extending laterally further from the central plane of the tire which is perpendicular to its rotative axis than, and being of less cross-sectional area than, the rib nearer the tire's periphery, the outer portion having also a base from which the ribs extend integrally therewith, said base beneath the ribs diminishing in thickness from the tread toward the rotative axis of the tire.

In testimony whereof I have hereunto set my hand at Grand Rapids, Michigan, this 23rd day of September, 1921.

HERBERT H. SWAN.